United States Patent
Wasko et al.

(10) Patent No.: US 12,255,734 B2
(45) Date of Patent: Mar. 18, 2025

(54) CLOCK SYNCHRONIZATION NIC OFFLOAD

(71) Applicant: MELLANOX TECHNOLOGIES, LTD., Yokneam (IL)

(72) Inventors: Wojciech Wasko, Młynek (PL); Dotan David Levi, Kiryat Motzkin (IL); Avi Urman, Yokneam (IL); Natan Manevich, Ramat HaSharon (IL)

(73) Assignee: Mellanox Technologies, Ltd, Yokneam (IL)

( * ) Notice: Subject to any disclaimer, the term of this patent is extended or adjusted under 35 U.S.C. 154(b) by 131 days.

(21) Appl. No.: 17/973,575

(22) Filed: Oct. 26, 2022

(65) Prior Publication Data
US 2024/0146431 A1   May 2, 2024

(51) Int. Cl.
*H04J 3/06* (2006.01)

(52) U.S. Cl.
CPC .................. *H04J 3/0638* (2013.01)

(58) Field of Classification Search
CPC .................. H04L 5/14; H04J 3/0638
See application file for complete search history.

(56) References Cited

U.S. PATENT DOCUMENTS

| | | |
|---|---|---|
| 6,212,197 B1 | 4/2001 | Christensen et al. |
| 6,564,267 B1 | 5/2003 | Lindsay |
| 6,816,492 B1 | 11/2004 | Turner et al. |
| 6,954,432 B1 | 10/2005 | Bychowsky et al. |
| 7,224,669 B2 | 5/2007 | Kagan et al. |
| 7,245,627 B2 | 7/2007 | Goldenberg et al. |
| 7,676,597 B2 | 3/2010 | Kagan et al. |
| 8,370,675 B2 | 2/2013 | Kagan |

(Continued)

FOREIGN PATENT DOCUMENTS

| | | |
|---|---|---|
| AU | 2012216611 B2 | 3/2013 |
| CN | 103354989 A | 10/2013 |

(Continued)

OTHER PUBLICATIONS

IEEE Standard 1588-2008, "IEEE Standard for a Precision Clock Synchronization Protocol for Networked Measurement and Control Systems", pp. 1-289, year 2008.

(Continued)

*Primary Examiner* — Bailor C Hsu
(74) *Attorney, Agent, or Firm* — Meitar Patents Ltd.; Daniel Kligler

(57) ABSTRACT

In one embodiment, a system includes a network interface controller including a device interface to connect to a processing device and receive a time synchronization marker message from an application running on the processing device, a network interface to send packets over a network, and packet processing circuitry to process the time synchronization marker message for sending via the network interface over the network to a slave clock device, generate a time synchronization follow-up message including a timestamp indicative of when the synchronization marker message egressed the network interface, and process the time synchronization follow-up message for sending via the network interface over the network to the slave clock device.

19 Claims, 4 Drawing Sheets

(56) References Cited

U.S. PATENT DOCUMENTS

| | | | | |
|---|---|---|---|---|
| 8,879,552 | B2* | 11/2014 | Zheng | H04J 3/0667 370/252 |
| 9,390,056 | B1 | 7/2016 | Noureddine et al. | |
| 9,397,960 | B2 | 7/2016 | Arad et al. | |
| 9,450,846 | B1* | 9/2016 | Huang | H04L 43/106 |
| 9,628,209 | B2* | 4/2017 | Kingsley | H04J 3/0667 |
| 9,667,446 | B2 | 5/2017 | Worrell | |
| 10,019,333 | B2* | 7/2018 | Regev | H04L 43/10 |
| 10,027,601 | B2 | 7/2018 | Narkis et al. | |
| 10,075,253 | B2* | 9/2018 | Olofsson | H04J 3/0673 |
| 10,084,559 | B1* | 9/2018 | Devineni | H04J 3/0661 |
| 10,187,400 | B1 | 1/2019 | Castro et al. | |
| 10,284,383 | B2 | 5/2019 | Bloch et al. | |
| 10,320,508 | B2 | 6/2019 | Shimizu et al. | |
| 10,727,966 | B1 | 7/2020 | Izenberg et al. | |
| 10,778,361 | B1 | 9/2020 | Almog et al. | |
| 11,271,874 | B2 | 3/2022 | Levi et al. | |
| 11,283,454 | B2 | 3/2022 | Ravid et al. | |
| 11,336,383 | B2 | 5/2022 | Mula et al. | |
| 11,388,263 | B2 | 7/2022 | Levi et al. | |
| 11,476,928 | B2 | 10/2022 | Levi et al. | |
| 11,543,852 | B2 | 1/2023 | Levi et al. | |
| 11,831,403 | B2* | 11/2023 | Lee | H04J 3/0667 |
| 2003/0002483 | A1 | 1/2003 | Zwack | |
| 2004/0174820 | A1 | 9/2004 | Ricciulli | |
| 2006/0007862 | A1 | 1/2006 | Sayeedi et al. | |
| 2006/0064579 | A1 | 3/2006 | Aaron et al. | |
| 2006/0095732 | A1 | 5/2006 | Tran et al. | |
| 2006/0153179 | A1 | 7/2006 | Ho et al. | |
| 2008/0298380 | A1 | 12/2008 | Rittmeyer et al. | |
| 2012/0201248 | A1 | 8/2012 | Aoki | |
| 2013/0027611 | A1 | 1/2013 | Closset | |
| 2013/0173950 | A1 | 7/2013 | Banerjea et al. | |
| 2014/0092918 | A1 | 4/2014 | Jost | |
| 2014/0379714 | A1 | 12/2014 | Hankins | |
| 2015/0046741 | A1 | 2/2015 | Yen et al. | |
| 2015/0055508 | A1 | 2/2015 | Ashida et al. | |
| 2015/0318015 | A1 | 11/2015 | Bose et al. | |
| 2017/0125026 | A1 | 5/2017 | Lawrence | |
| 2017/0171362 | A1 | 6/2017 | Bolotov et al. | |
| 2017/0188092 | A1 | 6/2017 | Lawrence | |
| 2017/0331926 | A1 | 11/2017 | Raveh et al. | |
| 2018/0124812 | A1 | 5/2018 | Thubert et al. | |
| 2018/0191629 | A1 | 7/2018 | Biederman et al. | |
| 2018/0309821 | A1 | 10/2018 | Byers et al. | |
| 2018/0351676 | A1* | 12/2018 | Butterworth | H04J 3/0667 |
| 2019/0056972 | A1 | 2/2019 | Zhou et al. | |
| 2019/0087352 | A1 | 3/2019 | Lee et al. | |
| 2019/0087652 | A1 | 3/2019 | Townsend et al. | |
| 2019/0124524 | A1 | 4/2019 | Gormley | |
| 2019/0149365 | A1 | 5/2019 | Chatterjee et al. | |
| 2019/0319730 | A1 | 10/2019 | Webb et al. | |
| 2019/0379714 | A1 | 12/2019 | Levi et al. | |
| 2020/0026656 | A1 | 1/2020 | Liao et al. | |
| 2020/0252320 | A1 | 8/2020 | Zemach et al. | |
| 2020/0259759 | A1 | 8/2020 | Shalev et al. | |
| 2021/0081352 | A1 | 3/2021 | Yang et al. | |
| 2021/0152267 | A1* | 5/2021 | Chan | H04L 51/23 |
| 2021/0328900 | A1 | 10/2021 | Sattinger et al. | |
| 2022/0116132 | A1* | 4/2022 | Kasichainula | H04L 7/048 |
| 2022/0360423 | A1 | 11/2022 | Levi et al. | |
| 2022/0416925 | A1 | 12/2022 | Levi et al. | |
| 2023/0262281 | A1* | 8/2023 | Kasichainula | H04N 21/8547 386/207 |

FOREIGN PATENT DOCUMENTS

| | | |
|---|---|---|
| EP | 0607412 B1 | 1/1999 |
| JP | 2005529523 A | 9/2005 |
| JP | 2007042145 A | 2/2007 |
| WO | 9418627 A2 | 8/1994 |
| WO | 9857497 A1 | 12/1998 |
| WO | 2001037489 A1 | 5/2001 |
| WO | 2010117359 A1 | 10/2010 |

OTHER PUBLICATIONS

Weibel et al., "Implementation and Performance of Time Stamping Techniques", 2004 Conference on IEEE 1588, pp. 1-29, Sep. 28, 2004.

InfiniBand™ Architecture Specification vol. 1, Release 1.2.1, pp. 1-1727, Nov. 2007.

Lu et al., "A Fast CRC Update Implementation", Computer Engineering Laboratory, Electrical Engineering Department, pp. 113-120, Oct. 8, 2003.

Mellette et al., "Toward Optical Switching in the Data Center", IEEE 19th International Conference on High Performance Switching and Routing (HPSR), pp. 1-6, Bucharest, Romania, Jun. 18-20, 2018.

Bakopoulos et al., "NEPHELE: an end-to-end scalable and dynamically reconfigurable optical architecture for application-aware SDN cloud datacenters", IEEE Communications Magazine, vol. 56, issue 2, pp. 1-26, Feb. 2018.

O-RAN Alliance, "O-RAN Fronthaul Working Group; Control, User and Synchronization Plane Specification", ORAN-WG4.CUS.0-v01.00, Technical Specification, pp. 1-189, year 2019.

Vattikonda et al., "Practical TDMA for Datacenter Ethernet", EuroSys conference, Bern, Switzerland, pp. 225-238, Apr. 10-13, 2012.

Ericsson Ab et al., "Common Public Radio Interface: eCPRI Interface Specification", V2.0, pp. 1-109, May 10, 2019.

Xilinx Inc., "Radio over Ethernet Framer v2.1", PB056 (v2.1), pp. 1-9, Oct. 30, 2019.

Weibel, H., "High Precision Clock Synchronization according to IEEE 1588 Implementation and Performance Issues", Zurich University of Applied Sciences, pp. 1-9, Jan. 17, 2005.

Sanchez-Palencia, J., "[RFC,v3,net-next,00/18] Time based packet transmission", pp. 1-14, Mar. 7, 2018.

IEEE Std 802.1Qaz™, "IEEE Standard for Local and metropolitan area networks—Media Access Control (MAC) Bridges and Virtual Bridged Local Area Networks—Amendment 18: Enhanced Transmission Selection for Bandwidth Sharing Between Traffic Classes", IEEE Computer Society, pp. 1-110, Sep. 30, 2011.

Crupnicoff et al., "Deploying Quality of Service and Congestion Control in InfiniBand-based Data Center Networks" White Paper, Mellanox Technologies Inc, Rev 1.0, pp. 1-19, Oct. 15, 2005.

Mathey et al., "Scalable Deadlock-Free Deterministic Minimal-Path Routing Engine for InfiniBand-Based Dragonfly Networks", IEEE Transactions on Parallel and Distributed Systems, vol. 29, No. 1, pp. 183-197, Jan. 2018.

Wikipedia, Precision Time Protocol, pp. 1-9, Apr. 20, 2020.

SMPTE Standard, "Professional Media Over Managed IP Networks:Traffic Shaping and Delivery Timing for Video", The Society of Motion Picture and Television Engineers, pp. 1-17, Nov. 22, 2017.

Wikipedia, "Time-Sensitive Networking", pp. 1-12, Mar. 5, 2020.

IEEE Standard 1588-2002, "IEEE Standard for a Precision Clock Synchronization Protocol for Networked Measurement and Control Systems", pp. 1-154, year 2002.

Yau et al., "Development of Situation-Aware Application Software for Ubiquitous Computing Environments," Proceedings of the 26th Annual International Computer Software and Applications Conference (COMSAC'02), IEEE Computer Society, pp. 1-6, year 2002.

Davie et al., "An Expedited Forwarding PHB (Per-Hop-Behavior)", RFC 3246, Network Working Group, pp. 1-32, Mar. 2002.

Mills, "Network Time Protocol (NTP)," RFC 0958, pp. 2-15, Sep. 1985.

Mills, "Network Time Protocol (Version 1): Specification and Implementation," RFC 1059, pp. 2-59, Jul. 1988.

Mills, "Internet Time Synchronization: The Network Time Protocol," IEEE Transactions on Communication, vol. 39, No. 10, pp. 1482-1493, Oct. 1991.

Mills, "Network Time Protocol (Version 3): Specification, Implementation and Analysis," RFC 1305, pp. 1-96, Mar. 1992.

Baboescu et al., "Scalable Packet Classification," Proceedings of SIGCOMM'01, ACM, pp. 199-210, year 2001.

(56) References Cited

OTHER PUBLICATIONS

Bader et al., "Survey and Comparison of Open Source Time Series Databases," BTW 2017, Workshopband, Lecture Notes in Informatics (LNI), Gesellschaft fuer Informatik, Bonn, pp. 249-268, year 2017.
Li et al., "Sundial: Fault-Tolerant Clock Synchronization for Datacenters," Proceedings of the 14th USENIX Symposium on Operating Systems Design and Implementation, Open Access, USENIX Association, pp. 1171-1186, Nov. 2020.
Levi et al., U.S. Appl. No. 17/667,600, filed Feb. 9, 2022.
"Time-Appliance-Project / Open-Time-Server," Spec Revision No. 1.0, GitHub, Inc., pp. 1-9, last updated Oct. 3, 2022, as downloaded from http://www.opentimeserver.com/.
Manevich et al., U.S. Appl. No. 17/579,630, filed Jan. 20, 2022.
Levi et al., U.S. Appl. No. 17/871,937, filed Jul. 24, 2022.
Levi et al., U.S. Appl. No. 17/868,841, filed Jul. 20, 2022.
Levi et al., U.S. Appl. No. 17/983,427, filed Nov. 9, 2022.
Manevich et al., U.S. Appl. No. 17/885,604, filed Aug. 11, 2022.
Manevich et al., U.S. Appl. No. 18/110,788, filed Feb. 16, 2023.
Wertheimer et al., U.S. Appl. No. 17/886,606, filed Aug. 12, 2022.
U.S. Appl. No. 17/667,600 Office Action dated Oct. 23, 2024.
U.S. Appl. No. 17/667,600 Office Action dated Dec. 16, 2024.

\* cited by examiner

CLOCK SYNCHRONIZATION NIC OFFLOAD

The project leading to this application has received funding from the European Union's Horizon 2020 research and innovation program under grant agreement No. 957403.

FIELD OF THE INVENTION

The present invention relates to computer networks, and in particular, but not exclusively to, clock synchronization in computer networks.

BACKGROUND

The Precision Time Protocol (PTP) is a protocol used to synchronize clocks throughout a computer network. A master clock device sends a clock synchronization marker message to a slave clock device across the network and measures when the marker message egresses the master clock device on to a network link. The master clock device then sends a clock synchronization follow-up message, which includes a timestamp indicating the time when the clock synchronization marker message egressed the master clock device. The reason for using the clock synchronization follow-up message to carry the time when the clock synchronization marker message leaves the master clock device is that is very difficult to measure when a message is leaving a device and to add a timestamp of that time in the same message. The slave clock then synchronizes its local clock based on the received messages and optionally other message interactions. The above process is known as 2-step PTP.

In one example, a user-space application running on a host device generates the clock synchronization marker message and provides the message to a kernel space driver which provides the message to a network interface controller (NIC). The NIC sends the message to the slave clock device and measures the time when the message egresses the NIC to the network, sometime known as "hitting the wire". The NIC returns the measured time to the kernel space driver. The user-space application polls the kernel space driver for the measured time. The user-space application generates the clock synchronization follow-up message and inserts the measured time in the clock synchronization follow-up message when received from the kernel space driver. The user-space application then provides the clock synchronization follow-up message to the kernel space, which provides the clock synchronization follow-up message to NIC, which sends the clock synchronization follow-up message to the slave clock device.

SUMMARY

There is provided in accordance with an embodiment of the present disclosure, a system including a network interface controller including a device interface to connect to a processing device and receive a time synchronization marker message from an application running on the processing device, a network interface to send packets over a network, and packet processing circuitry to process the time synchronization marker message for sending via the network interface over the network to a slave clock device, generate a time synchronization follow-up message including a timestamp indicative of when the synchronization marker message egressed the network interface, and process the time synchronization follow-up message for sending via the network interface over the network to the slave clock device.

Further in accordance with an embodiment of the present disclosure the packet processing circuitry is configured to generate the time synchronization follow-up message autonomously of the application running on the processing device.

Still further in accordance with an embodiment of the present disclosure, the system includes the processing device, wherein the application is configured to generate the time synchronization marker message but not the time synchronization follow-up message.

Additionally in accordance with an embodiment of the present disclosure the packet processing circuitry is configured to duplicate the time synchronization marker message in a transmission pipeline of the packet processing circuitry as the time synchronization follow-up message for sending to the slave clock device.

Moreover in accordance with an embodiment of the present disclosure the packet processing circuitry is configured to perform a packet loopback of the time synchronization marker message in a transmission pipeline of the packet processing circuitry yielding a loop-backed packet directed towards a receive pipeline of the packet processing circuitry with the timestamp added to metadata of the loop-backed packet, and perform a hairpin operation to move the loop-backed packet from the receive pipeline to the transmission pipeline for sending to the slave clock device as the time synchronization follow-up message.

Further in accordance with an embodiment of the present disclosure the packet processing circuitry is configured to change an operation code field of the loop-backed packet from marker message to follow-up message.

Still further in accordance with an embodiment of the present disclosure the packet processing circuitry is configured to insert the timestamp into a header of the loop-backed packet responsively to the timestamp in the metadata of the loop-backed packet.

Additionally in accordance with an embodiment of the present disclosure the packet processing circuitry is configured to insert the timestamp into a preciseOriginTimestamp field of the loop-backed packet.

Moreover, in accordance with an embodiment of the present disclosure, the system includes a kernel space driver disposed between the application and the network interface controller.

Further in accordance with an embodiment of the present disclosure, the system includes the slave clock device including clock synchronization circuitry to receive the time synchronization marker message, and receive the time synchronization follow-up message while being unaware that the time synchronization follow-up message was generated by the network interface controller and not the application running on the processing device.

There is also provided in accordance with another embodiment of the present disclosure, a time synchronization method, including connecting to a processing device, receiving a time synchronization marker message from an application running on the processing device, sending packets over a network, processing by a network interface controller the time synchronization marker message for sending via a network interface over the network to a slave clock device, generating by the network interface controller a time synchronization follow-up message including a timestamp indicative of when the synchronization marker message egressed the network interface, and processing by the network interface controller the time synchronization follow-up message for sending via the network interface over the network to the slave clock device.

Still further in accordance with an embodiment of the present disclosure the generating includes generating the time synchronization follow-up message autonomously of the application running on the processing device.

Additionally in accordance with an embodiment of the present disclosure, the method includes the application generating the time synchronization marker message but not the time synchronization follow-up message.

Moreover, in accordance with an embodiment of the present disclosure, the method includes duplicating by the network interface controller the time synchronization marker message in a transmission pipeline as the time synchronization follow-up message for sending to the slave clock device.

Further in accordance with an embodiment of the present disclosure, the method includes performing by the network interface controller a packet loopback of the time synchronization marker message in a transmission pipeline yielding a loop-backed packet directed towards a receive pipeline with the timestamp added to metadata of the loop-backed packet, and performing a hairpin operation to move the loop-backed packet from the receive pipeline to the transmission pipeline for sending to the slave clock device as the time synchronization follow-up message.

Still further in accordance with an embodiment of the present disclosure, the method includes changing an operation code field of the loop-backed packet from marker message to follow-up message.

Additionally in accordance with an embodiment of the present disclosure, the method includes inserting the timestamp into a header of the loop-backed packet responsively to the timestamp in the metadata of the loop-backed packet.

Moreover, in accordance with an embodiment of the present disclosure the inserting includes inserting the timestamp into a preciseOriginTimestamp field of the loop-backed packet.

Further in accordance with an embodiment of the present disclosure, the method includes receiving by the slave clock device the time synchronization marker message, and receiving by the slave clock device the time synchronization follow-up message while being unaware that the time synchronization follow-up message was generated by the network interface controller and not the application running on the processing device.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
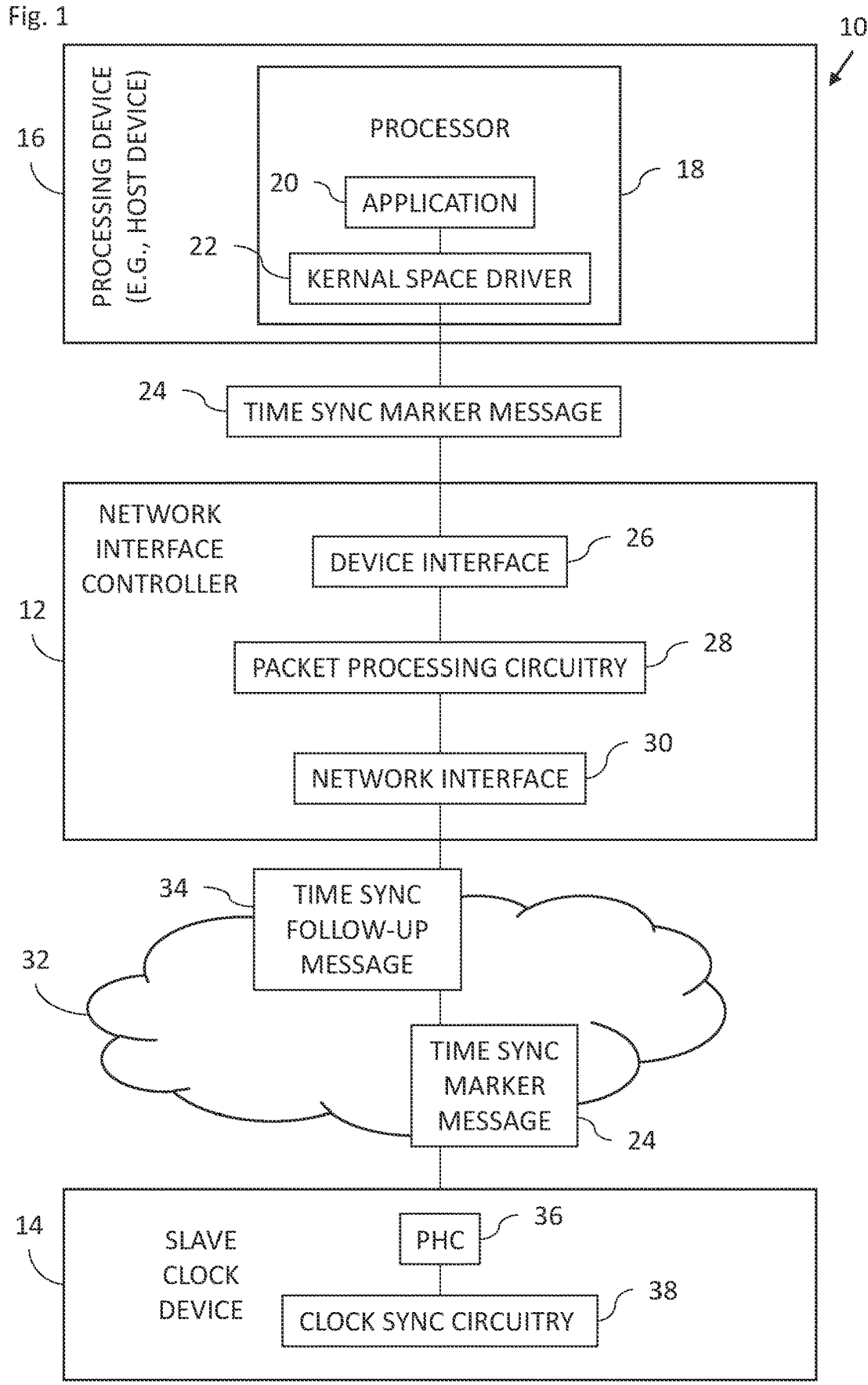
FIG. 1 is a block diagram view of clock synchronization system constructed and operative in accordance with an embodiment of the present invention.

As previously mentioned, a user-space application running on a host device generates a clock synchronization marker message and provides the message to a kernel space driver which provides the message to a network interface controller (NIC). The NIC sends the message to the slave clock device and measures the time when the message egresses the NIC over the network, sometime known as "hitting the wire". The NIC returns the measured time to the kernel space driver. The user-space application polls the kernel space driver for the measured time. The user-space application generates the clock synchronization follow-up message and inserts the measured time in the clock synchronization follow-up message when received from the kernel space driver. The user-space application then provides the clock synchronization follow-up message to the kernel space, which provides the clock synchronization follow-up message to NIC, which sends the clock synchronization follow-up message to the slave clock device. Generating the clock synchronization messages is a very processing intensive and is compounded by the number of slave clock devices in the network.

Embodiments of the present invention provide a system to generate clock synchronization follow-up messages in a NIC thereby offloading this task from a user-space application running on a host to the NIC. The clock synchronization marker messages are still generated by the user-space application for sending by the NIC to the slave clock devices.

In some embodiments, the clock synchronization marker message is duplicated in the transmission pipeline of the NIC as a clock synchronization follow-up message. The time that the clock synchronization marker message egresses the NIC is added to a header of the clock synchronization follow-up message and the operational code of the clock synchronization follow-up message is generally updated to "follow-up message".

In other embodiments, a packet loopback of the clock synchronization marker message is performed towards the end of the transmission pipeline whereby the original clock synchronization marker message continues to egress the NIC whereas a copy of the clock synchronization marker message (i.e., a loop-backed packet) is directed towards a receive pipeline of the NIC with a timestamp (indicative of the time that the original clock synchronization marker message egresses the NIC) added to metadata of the loop-backed packet. The original clock synchronization marker message is included in the payload of the loop-backed packet. A hairpin operation is performed on the loop-backed packet moving the loop-backed packet into the transmission pipeline. The timestamp is taken from the metadata of the loop-backed packet and inserted into the header of the loop-backed packet and the operation code field of the loop-backed packet is changed from marker message to "follow-up message". The above insertions and changes may be performed using steering actions in the transmission pipeline that identify a loop-backed packet with a status of "marker message". Optionally, other fields of the loop-backed packet are modified, added or removed (e.g., optional TLV (type-length-value) fields).

In some embodiments, the user-space application may be aware that follow-up messages are being sent by the NIC (e.g., 2-step PTP where the generation of the follow-up messages is offloaded to the NIC), whereas in other embodiments, the user-space application may be unaware that the NIC is generating follow-up messages.

System Description

Reference is now made to FIG. 1, which is a block diagram view of clock synchronization system 10 constructed and operative in accordance with an embodiment of the present invention.

The system 10 may include a host device 16 (or any suitable processing device such as a central processing unit (CPU) or graphics processing unit (GPU)), a network interface controller 12 and a slave clock device 14. The host device 16 and the network interface controller 12 may also be known as a master clock device.

The host device 16 may include a processor 18 which is configured to run an application 20 and a kernel space driver 22, which is disposed logically between the application 20 and the network interface controller 12. The application 20 is configured to generate a time synchronization marker message 24, which is provided to the kernel space driver 22 and then to the network interface controller 12 for sending to the slave clock device 14 over a network 32.

The network interface controller 12 includes a device interface 26, packet processing circuitry 28, and a network interface 30. The packet processing circuitry 28 may include a physical layer (PHY) module and a MAC layer module, by way of example.

Figure 2:
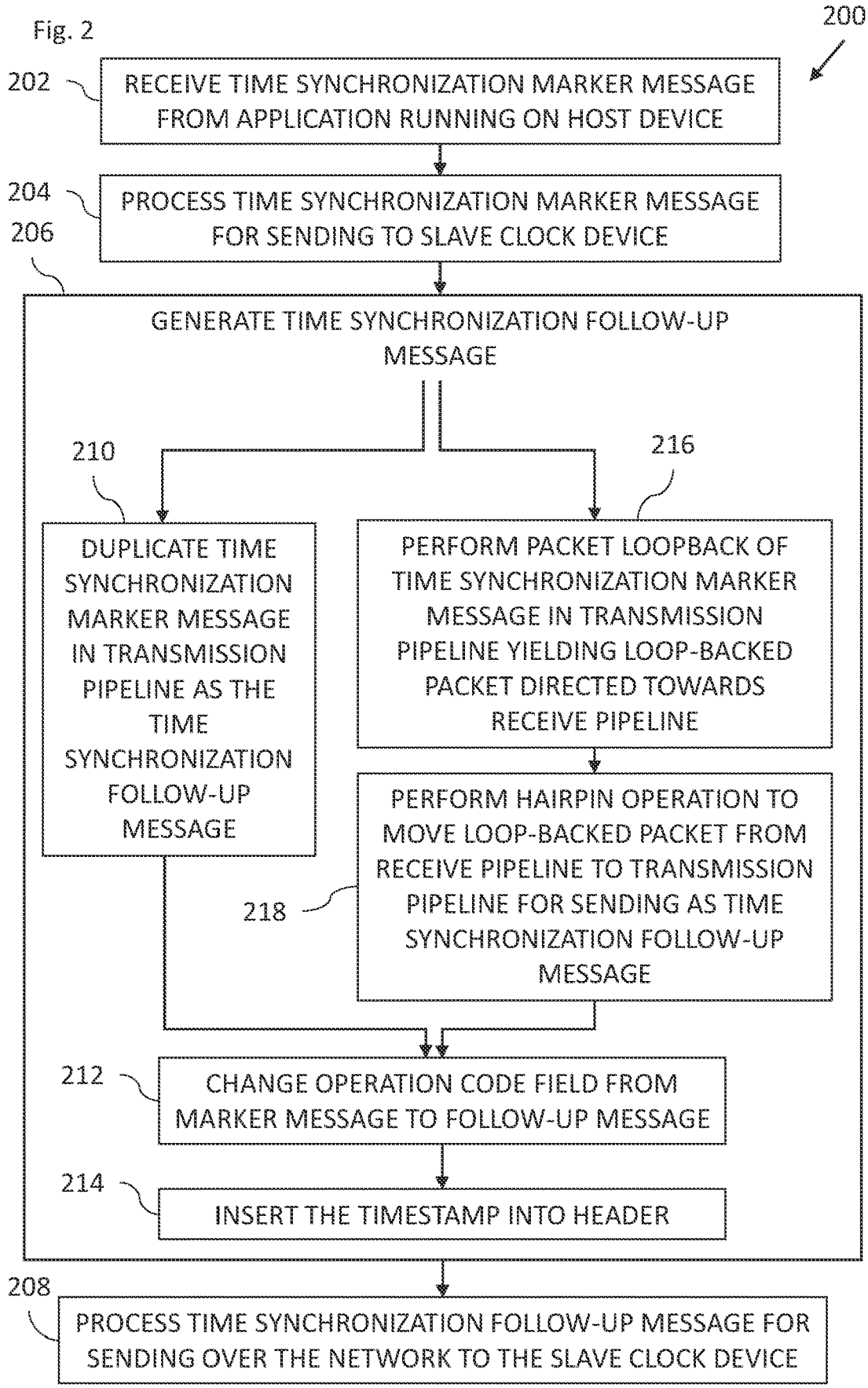
FIG. 2 is a flowchart including steps in a method of operation of the system of FIG. 1.

Reference is now made to FIG. 2, which is a flowchart 200 including steps in a method of operation of the system 10 of FIG. 1. Reference is also made to FIG. 1. The device interface 26 is configured to connect to the host device 16 and receive the time synchronization marker message 24 from the application 20 running on the host device 16 optionally via the kernel space driver 22 (block 202). The packet processing circuitry 28 is configured process the time synchronization marker message 24 for sending via the network interface 30 over the network 32 to the slave clock device 14 (block 204). The network interface 30 is configured to send packets (including the time synchronization marker message 24) over the network 32 to the slave clock device 14.

The packet processing circuitry 28 is configured to generate a time synchronization follow-up message 34 including a timestamp indicative of when the synchronization marker message 24 egressed the network interface 30 (block 206).

The packet processing circuitry is configured to generate the time synchronization follow-up message 34 autonomously of the application 20 running on the host device 16. In some embodiments, the application 20 running on the host device 16 is configured to generate the time synchronization marker message 24, but not the time synchronization follow-up message 34.

The packet processing circuitry 28 is configured to process the time synchronization follow-up message 34 for sending via the network interface 30 over the network 32 to the slave clock device 14 (block 208).

In practice, some or all of the functions of the packet processing circuitry 28 may be combined in a single physical component or, alternatively, implemented using multiple physical components. These physical components may comprise hard-wired or programmable devices, or a combination of the two. In some embodiments, at least some of the functions of the packet processing circuitry 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The slave clock device 14 includes: a physical hardware clock 36 to maintain a clock time; and clock synchronization circuitry 38. The clock synchronization circuitry 38 is configured to receive the time synchronization marker message 24 and the time synchronization follow-up message 34 while being unaware that the time synchronization follow-up message 34 was generated by the network interface controller 12 and not by the application 20 running on the host device 16. The clock synchronization circuitry 38 is configured to adjust the clock time of the physical hardware clock 36 responsively to receiving the messages 24, 34 and optionally other message interactions, e.g., to measure transit time between the master clock device and the slave clock device 14.

Figure 3:
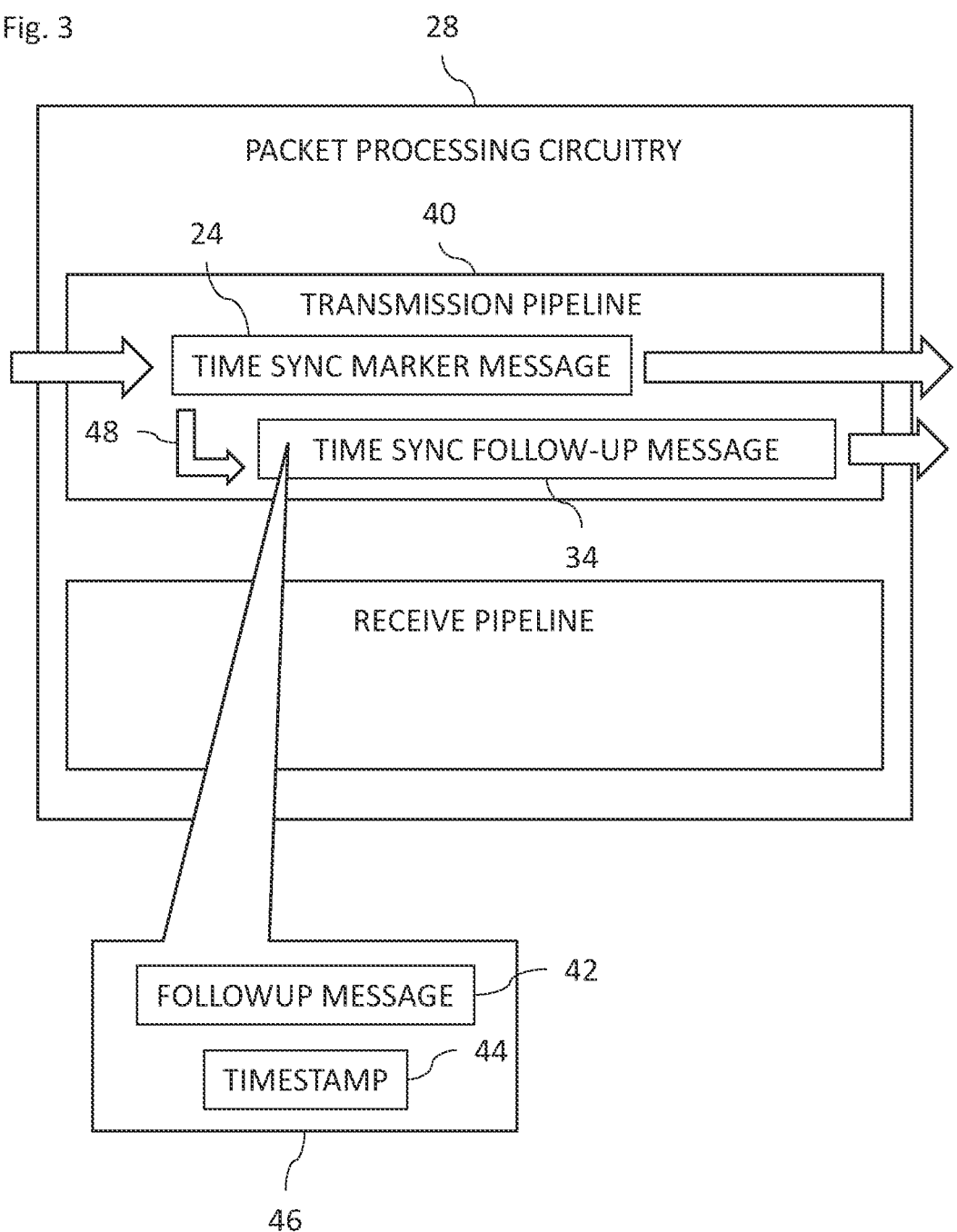
FIG. 3 is a detailed view of packet processing circuitry in the system of FIG. 1 generating a time synchronization follow-up message.

Reference is now made to FIG. 3, which is a detailed view of packet processing circuitry 28 in the system 10 of FIG. 1 generating the time synchronization follow-up message 34. Reference is also made to FIG. 2.

In some embodiments, the packet processing circuitry 28 is configured to duplicate (arrow 48) the time synchronization marker message 24 in a transmission pipeline 40 of the packet processing circuitry 28 as the time synchronization follow-up message 34 for sending to the slave clock device 14 (block 210). The packet processing circuitry 28 is configured to change an operation code field 42 of the time synchronization follow-up message 34 from marker message to follow-up message (block 212). The packet processing circuitry 28 is configured to insert a timestamp 44 (indicative of the time that the time synchronization marker message 24 egressed the network interface 30) into a header 46 of the time synchronization follow-up message 34 (block 214). In some embodiments, the packet processing circuitry 28 is configured to insert the timestamp 44 into a preciseOriginTimestamp field of the time synchronization follow-up message 34.

Figure 4:
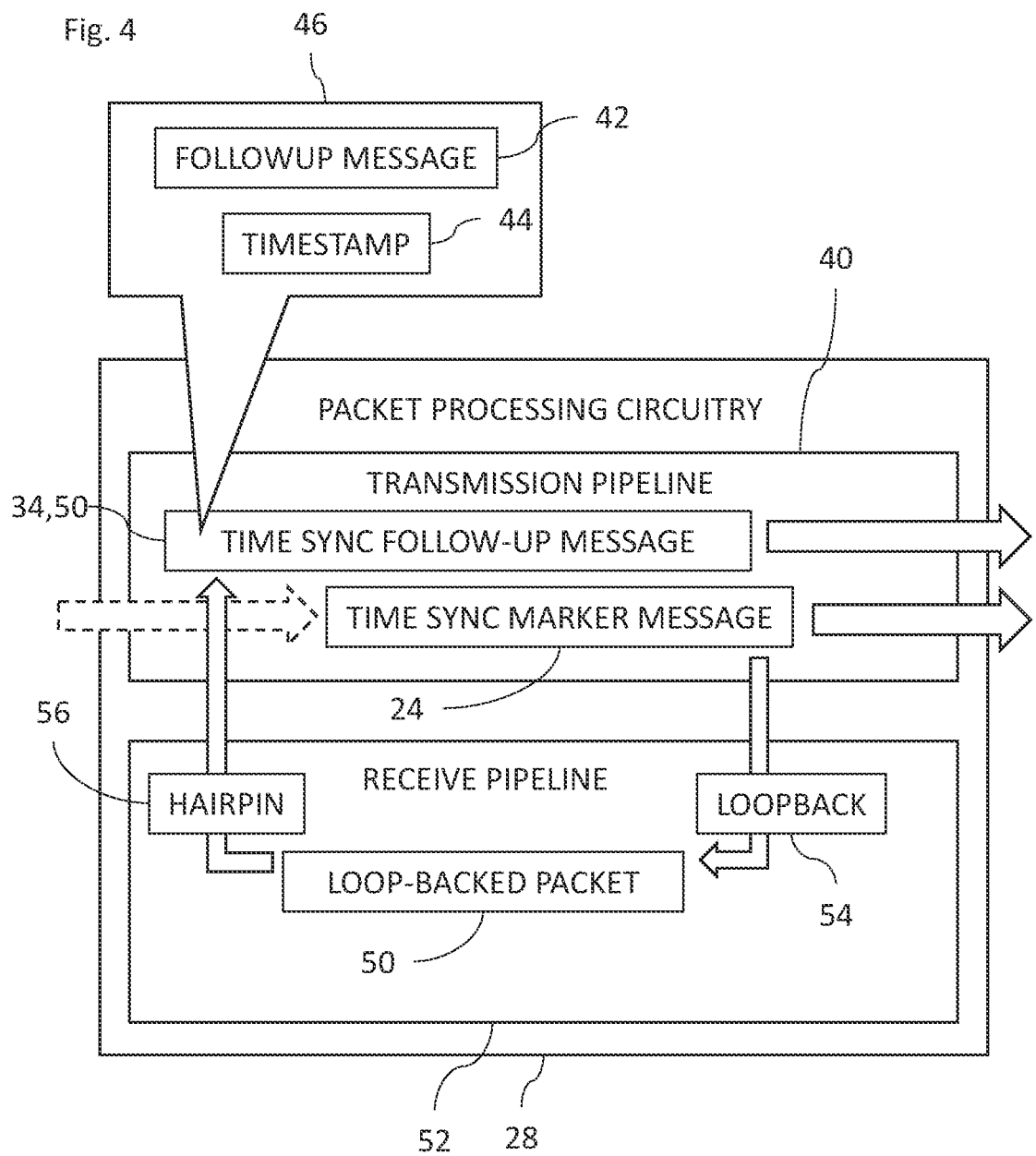
FIG. 4 is a detailed view of packet processing circuitry in the system of FIG. 1 generating a time synchronization follow-up message according to an alternative method.

Reference is now made to FIG. 4, which is a detailed view of packet processing circuitry 28 in the system 10 of FIG. 1 generating the time synchronization follow-up message 34 according to an alternative method. Reference is also made to FIG. 2.

The packet processing circuitry 28 is configured to perform a packet loopback (block 54) of the time synchronization marker message 24 in the transmission pipeline 40 yielding a loop-backed packet 50 directed towards a receive pipeline 52 of the packet processing circuitry 28 with the timestamp 44 added to metadata of the loop-backed packet 50 (block 216). The time synchronization marker message 24 is typically included in a payload of the loop-backed packet 50.

The packet processing circuitry 28 is configured to perform a hairpin operation (block 56) to move the loop-backed packet 50 from the receive pipeline 52 to the transmission pipeline 40 for sending to the slave clock device 14 as the time synchronization follow-up message 34 (block 218).

In some embodiments, the packet processing circuitry 28 is configured to change an operation code field 42 of the loop-backed packet 50 (i.e., time synchronization follow-up message 34) from marker message to follow-up message (typically in the transmission pipeline 40) (block 212). In some embodiments, the packet processing circuitry 28 is configured to insert the timestamp 44 into the header 46 of the loop-backed packet 50 (i.e., the time synchronization follow-up message 34), typically in the transmission pipeline 40, responsively to the timestamp 44 in the metadata of the loop-backed packet 50 (block 214). In some embodiments, the packet processing circuitry 28 is configured to insert the timestamp into a preciseOriginTimestamp field of the loop-backed packet 50.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising a network interface controller (NIC) including:
a device interface to connect to a processing device and receive a time synchronization marker message from an application running on the processing device;
a network interface to send packets over a network; and
packet processing circuitry to:
process the time synchronization marker message for sending via the network interface over the network to a slave clock device;
generate a time synchronization follow-up message including a timestamp indicative of when the synchronization marker message egressed the network interface, thereby offloading generation of the time synchronization follow-up message from the application running on the processing device to the NIC; and
process the time synchronization follow-up message for sending via the network interface over the network to the slave clock device.

2. The system according to claim 1, wherein the packet processing circuitry is configured to generate the time synchronization follow-up message autonomously of the application running on the processing device.

3. The system according to claim 1, further comprising the processing device, wherein the application is configured to generate the time synchronization marker message but not the time synchronization follow-up message.

4. The system according to claim 1, wherein the packet processing circuitry is configured to duplicate the time synchronization marker message in a transmission pipeline of the packet processing circuitry as the time synchronization follow-up message for sending to the slave clock device.

5. The system according to claim 1, wherein the packet processing circuitry is configured to:
perform a packet loopback of the time synchronization marker message in a transmission pipeline of the packet processing circuitry yielding a loop-backed packet directed towards a receive pipeline of the packet processing circuitry with the timestamp added to metadata of the loop-backed packet; and
perform a hairpin operation to move the loop-backed packet from the receive pipeline to the transmission pipeline for sending to the slave clock device as the time synchronization follow-up message.

6. The system according to claim 5, wherein the packet processing circuitry is configured to change an operation code field of the loop-backed packet from marker message to follow-up message.

7. The system according to claim 5, wherein the packet processing circuitry is configured to insert the timestamp into a header of the loop-backed packet responsively to the timestamp in the metadata of the loop-backed packet.

8. The system according to claim 7, wherein the packet processing circuitry is configured to insert the timestamp into a preciseOriginTimestamp field of the loop-backed packet.

9. The system according to claim 1, further comprising a kernel space driver disposed between the application and the network interface controller.

10. The system according to claim 1, further comprising the slave clock device including clock synchronization circuitry to:
receive the time synchronization marker message; and
receive the time synchronization follow-up message while being unaware that the time synchronization follow-up message was generated by the network interface controller and not the application running on the processing device.

11. A time synchronization method, comprising:
connecting to a processing device;
receiving a time synchronization marker message from an application running on the processing device;
sending packets over a network;
processing by a network interface controller (NIC) the time synchronization marker message for sending via a network interface over the network to a slave clock device;
generating by the NIC a time synchronization follow-up message including a timestamp indicative of when the synchronization marker message egressed the network interface, thereby offloading generation of the time synchronization follow-up message from the application running on the processing device to the NIC; and
processing by the NIC the time synchronization follow-up message for sending via the network interface over the network to the slave clock device.

12. The method according to claim 11, wherein the generating includes generating the time synchronization follow-up message autonomously of the application running on the processing device.

13. The method according to claim 11, further comprising the application generating the time synchronization marker message but not the time synchronization follow-up message.

14. The method according to claim 11, further comprising duplicating by the network interface controller the time synchronization marker message in a transmission pipeline as the time synchronization follow-up message for sending to the slave clock device.

15. The method according to claim 11, further comprising:
performing by the network interface controller a packet loopback of the time synchronization marker message in a transmission pipeline yielding a loop-backed packet directed towards a receive pipeline with the timestamp added to metadata of the loop-backed packet; and
performing a hairpin operation to move the loop-backed packet from the receive pipeline to the transmission pipeline for sending to the slave clock device as the time synchronization follow-up message.

16. The method according to claim 15, further comprising changing an operation code field of the loop-backed packet from marker message to follow-up message.

17. The method according to claim 15, further comprising inserting the timestamp into a header of the loop-backed packet responsively to the timestamp in the metadata of the loop-backed packet.

18. The method according to claim 17, wherein the inserting includes inserting the timestamp into a preciseOriginTimestamp field of the loop-backed packet.

19. The method according to claim 11, further comprising:
- receiving by the slave clock device the time synchronization marker message; and
- receiving by the slave clock device the time synchronization follow-up message while being unaware that the time synchronization follow-up message was generated by the network interface controller and not the application running on the processing device.

* * * * *